United States Patent [19]

Schold

[11] 4,114,816

[45] Sep. 19, 1978

[54] APPARATUS FOR DISPERSING FINELY DIVIDED SOLID PARTICLES IN A LIQUID VEHICLE

[76] Inventor: George R. Schold, 7909 2nd St. North, St. Petersburg, Fla. 33702

[21] Appl. No.: 671,617

[22] Filed: Mar. 29, 1976

[51] Int. Cl.² .......................................... B02C 23/36
[52] U.S. Cl. .................................. 241/46.11; 241/74; 251/DIG. 3
[58] Field of Search ............... 241/74, 46.11, 46.15, 241/46.17; 251/DIG. 3; 137/525, 535

[56] References Cited

U.S. PATENT DOCUMENTS

| 2,965,129 | 12/1960 | Faust | 251/DIG. 3 |
| 3,653,600 | 4/1972 | Schold | 241/74 |
| 3,844,490 | 10/1974 | Schold et al. | 241/74 |
| 3,884,447 | 5/1975 | Alexander et al. | 251/DIG. 3 |
| 3,896,834 | 7/1975 | Paul, Jr. | 251/DIG. 3 |

*Primary Examiner*—Granville Y. Custer, Jr.
*Attorney, Agent, or Firm*—Frank R. Thienpont

[57] ABSTRACT

Apparatus for dispersing solid particles in a liquid vehicle utilizing a combination spring check valve and dump valve disposed in the base of the mixing vessel of the apparatus, the check valve being disposed in the inlet to the mixing vessel to open in response to the feed pressure of the material being fed through the valve into the mixing vessel, the valve further including means for opening same to allow drainage therethrough of liquid material in the vessel.

13 Claims, 5 Drawing Figures

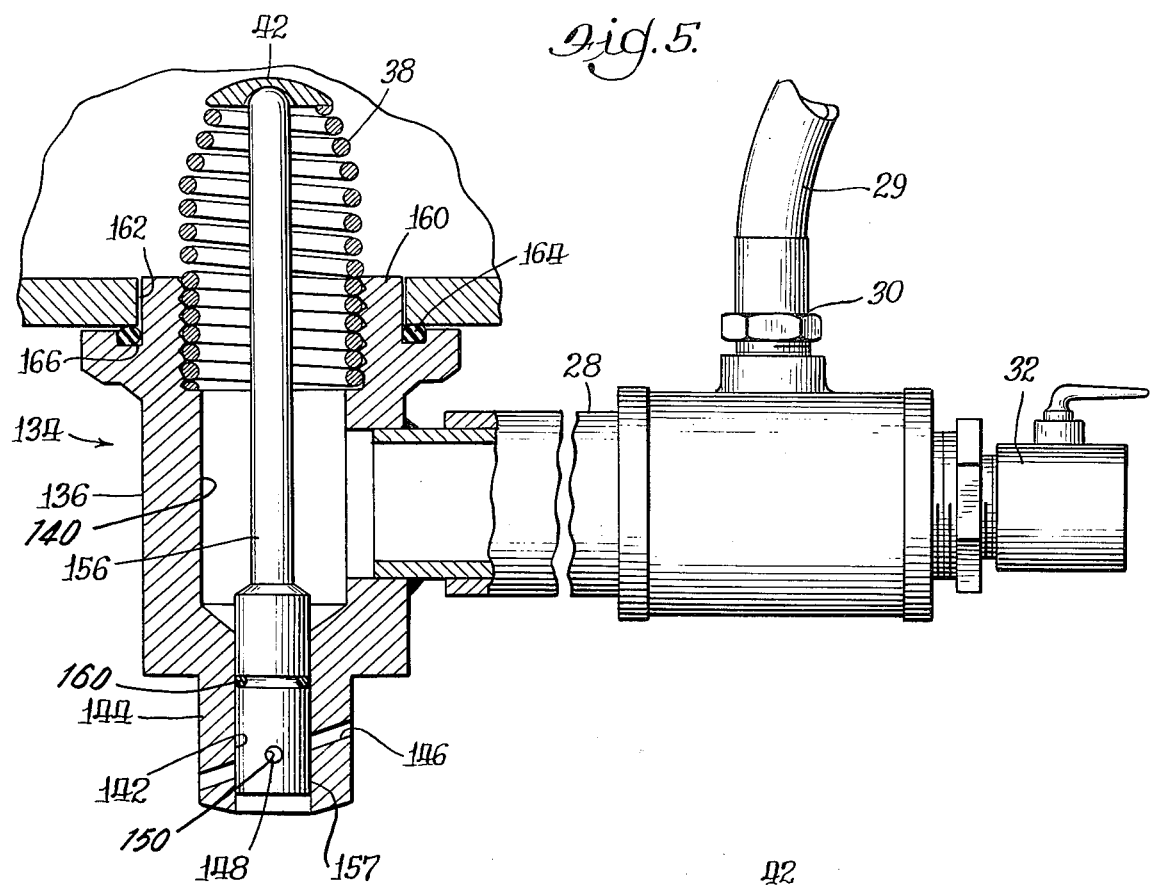
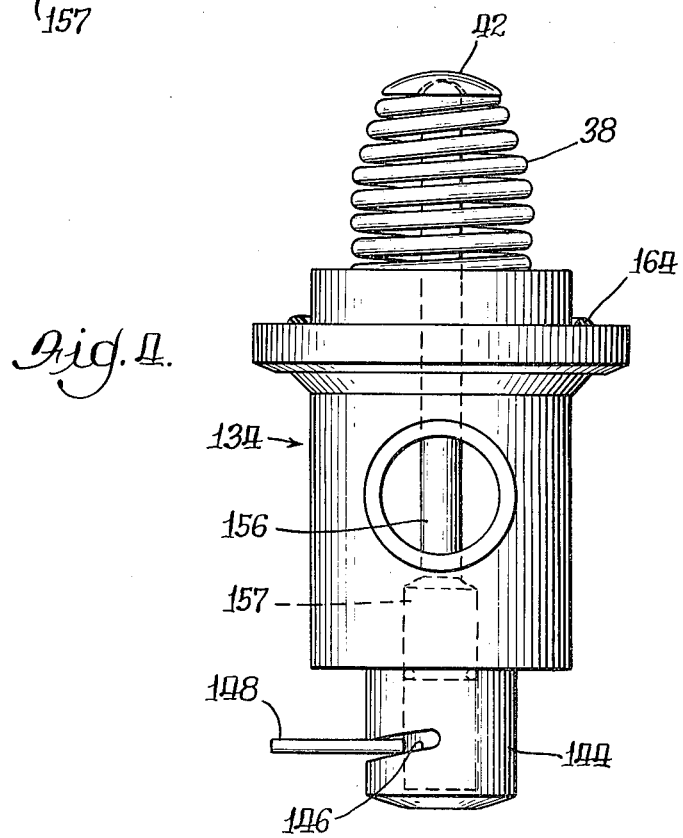

APPARATUS FOR DISPERSING FINELY DIVIDED SOLID PARTICLES IN A LIQUID VEHICLE

BACKGROUND OF THE INVENTION

This invention relates to apparatus for uniformly producing finely divided particles and uniformly distributing such finely divided particles in a liquid vehicle.

The invention herein constitutes an improvement to apparatus generally of the type disclosed in my U.S. Pat. Nos. 3,653,600 issued Apr. 4, 1972, and 3,844,490 issued Oct. 29, 1974.

In this type of apparatus check valves are used in the inlet to the bottom of the mixing vessel. However, the dispersing media, such as metal shot, for example, often tends to clog up check valves which have heretofore been used in the apparatus. This is especially true where the inlet and associated check valve are disposed in the base of the mixing vessel. Accordingly, because of the proximity of the dispersing media, it becomes necessary to have a check valve arrangement which will function without being subject to the danger of clogging.

SUMMARY OF THE INVENTION

A principal object of this invention is to provide in the inlet to a shot mill apparatus an inlet check valve which will have very little tendency to become clogged.

Another object of this invention is to provide in apparatus for dispersing finely divided solid particles in a liquid vehicle and utilizing a dispersing media such as metal shot, a combination spring check valve and dump valve.

Another object of this invention is to provide in a dispersing apparatus of the type herein described a combination check and dump valve which is simple and inexpensive to manufacture, is easy to install and is easily serviced.

Other objects and advantages of this invention will become more readily apparent when considering the following description and accompanying drawings.

BRIEF DESCRIPTION OF THE DRAWINGS

FIG. 4 is a view in elevation of a second embodiment of a combination check and dump valve in its open position;

FIG. 5 is a sectional view in elevation of the valve of FIG. 4 with attached inlet pipe.

DESCRIPTION OF PREFERRED EMBODIMENTS

Figure 1:
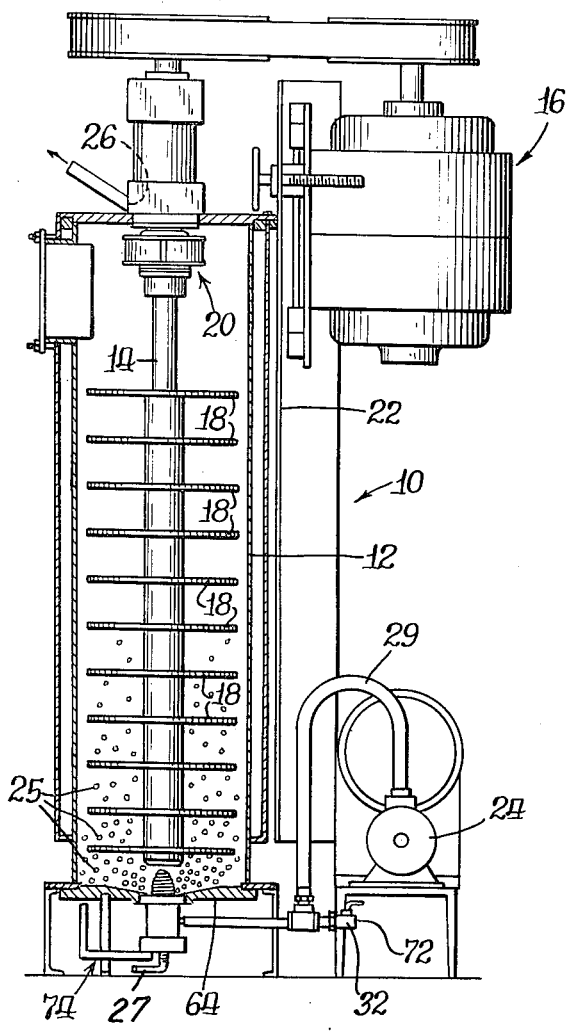
FIG. 1 is a side view in elevation of apparatus of the type which may embody the present invention.

We refer now to the drawings wherein like reference characters in the several views refer to similar parts. Referring to FIG. 1, 10 designates generally the dispersing apparatus or mill embodying the invention herein. The dispersing apparatus 10 which is substantially like that disclosed in my U.S. Pat. No. 3,653,600, comprises a generally cylindrical vessel 12, a rotatable agitator shaft 14, a drive unit 16 for driving the shaft 14, a plurality of impellers or agitator discs 18 mounted on the shaft 14 and a rotor separator 20 secured to the shaft 14. The vessel 12 and drive unit 16 usually are mounted on a suitable supporting frame 22. A 24 22 is associated with the mill to introduce premixed material into the vessel 12 to be processed.

The vessel is partially filled with a dispersing media 25 such as metal shot, for example, but other types of dispersing media can also be used. When steel shot is used, the vessel preferably is filled only about half way.

In the illustrated embodiment the vessel 12 is closed at both its upper and lower ends. An outlet 26 is disposed at the upper end of the vessel. An inlet 27 is disposed at the lower end of the vessel through which product to be processed is pumped from pump 24 via inlet pipe 28 and conduit 29, the conduit 29 being connected to the inlet pipe by way of a connecting nipple 30 or the like. The unattached end of the inlet pipe 28 has a normally closed shut-off valve 32 which is opened when the mixing vessel is to be drained.

Figure 2:
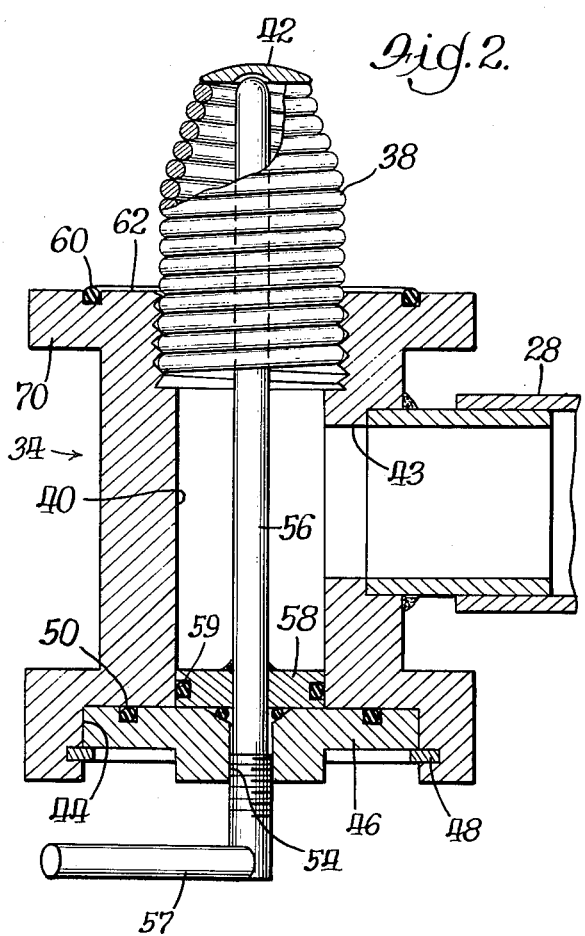
FIG. 2 is a sectional view in elevation of one embodiment of the combination check and dump valve of the invention in its closed position.
Figure 3:
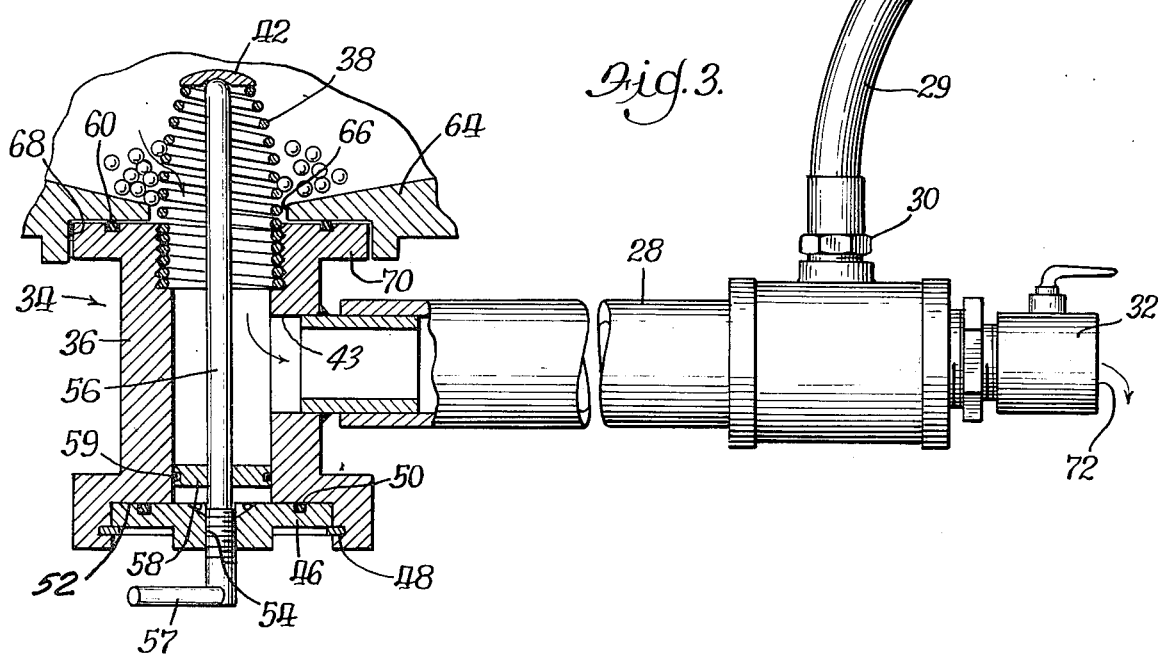
FIG. 3 is a sectional view in elevation of the valve of FIG. 2 in its open position.

A valve is disposed between the inlet 27 and inlet pipe 28. One embodiment of such a valve is valve 34 which comprises a valve body 36 and a coil compression spring 38 which is screwed into a threaded portion of the upper part of an elongated bore 40 which is formed in and extends through the valve body. A solid plate 42 is secured to the upper end of spring 38 to close the open end. The coils of the compression spring 38 are normally tightly fitted against one another as seen in FIG. 2, so that material may not pass therethrough in either direction in the absence of some force which is sufficient to pull them apart as seen in FIG. 3.

The inlet pipe 28 is appropriately connected to an inlet opening 43 which communicates with bore 40. The lower end of the valve body 36 may be formed with a counterbore 44 formed concentrically with bore 40. The counterbore 44 receives a flange 46 which may be held in place by a retainer ring 48. A seal such as an O-ring seal 50 may be disposed in the upper surface of the flange 46 for sealing contact with the face 52 of the valve body. The flange 46 may be formed with a central threaded bore 54 for threadedly receiving therethrough an elongated pin or stem 56 which extends through bore 40. The stem 56 is long enough so that the upper end thereof may be moved into engagement with the underside of plate 42. Rotation of the stem 56 by means of associated lever 57 to move it upwardly against plate 42 will stretch spring 38 opening the coils thereof.

An annular flange 58 may be secured to the lower end of the stem 56 by suitable means such as welding. The flange 58 is designed for slidable engagement in the bore 40. The flange 58 may have a seal member such as an O-ring seal 59 disposed on its outer periphery to thereby provide a seal with the bore 40.

A seal member such as an O-ring seal 60 may be associated with the upper surface 62 of the valve body for sealing engagement with the base 64 of the mixing vessel 12. The base 64 may be formed with a central bore 66 through which the coil spring 38 extends and a counterbore 68 receiving the flange 70 of the valve body. The valve 34 preferably is positioned at the center of the base 64 so that the coil spring valve 38 is positioned directly under the end of the shaft 14.

It will be apparent that when product is pumped into the mixing vessel under pressure by way of conduits 28 and 29 and bore 40 from the pump 24, the coils of the coil spring valve 38 will open in response to the pressure of the product on the plate 42 attached to the end of the spring 38. When the pressure is reduced below a certain amount, the spring check valve will close preventing product from backing into the conduits 28 and 29.

After a product run, if it becomes desirable to remove the remaining product from the mixing vessel, the valve 34 may be used as a dump valve. To do this, the stem 56 is advanced against the underside of the plate 42 by rotating it in the threaded connection at 54, thereby pulling apart the coils of the compression spring 38. This permits the product to drain through the spring 38, the bore 40 and the conduit 28 through valve 32 to drain outlet 72.

An easily releasable clamping means such, for example, as a bar clamp 74 may be associated with the base to clamp the combination check and dump valve in place in the base of the mixing vessel. This permits easy removal of the valve.

A second embodiment 134 of a combination check and dump valve is shown in FIGS. 4 and 5. It operates in substantially the same manner as the valve 34 shown in FIGS. 2 and 3. The primary difference is that in the valve of FIGS. 4 and 5 the stem for opening the coil spring valve for draining is advanced against the plate 42 by means of a cam arrangement associated with the lower end of the valve body. The valve 134 comprises a valve body 136 having a bore 140 into the upper end of which the coil spring valve 38 is threadedly secured. The lower end of the valve body 136 is formed with a smaller bore 142 coaxial with bore 140. The lower end of the valve body may be formed with a substantially cylindrical boss 144 which has formed therein a spiral or helical camming slot 146 which may extend approximately half way around the boss. The slot 146 is adapted to accommodate a small pin or lever 148 which extends through the slot 146 into the lower end of stem 156. The bore 142 has slidably disposed therein the enlarged end portion 157 of stem 156. An O-ring seal 160 is positioned around the end portion 157 to provide a seal between the valve body and the stem. A radially extending opening 150 in the lower end portion 157 of the stem 156 is adapted to receive the pin 148. Rotation of the stem 156 and simultaneous advancement or retraction thereof is accomplished by moving the pin 148 circumferentially in the spirally formed camming slot 146.

The upper end of the valve body generally is provided with a seal arrangement for cooperation with the base of the mixing vessel. The upper end of the valve body may be constructed with a boss 160 which extends into a bore 162 of the base and around which an O-ring seal 164 is disposed in an undercut 166. This arrangement could also be used on the embodiment shown in FIGS. 2 and 3 and the upper flange arrangement 70 could be used on the valve of FIGS. 4 and 5.

The coil spring valve is particularly desirable in this environment both as an inlet check valve and as a drain valve. Since it is essential both during the movement of material into the vessel and draining of material (at some other time) that no clogging of the inlet take place, the coils of the compression spring valve open just enough to permit product to pass between the coils but not so much as to allow the dispersing media to lodge between the coils. The opening between the coils, of course, is controllable.

It will be quite apparent that the embodiments of a combination check and dump valve disclosed herein are simple to manufacture, and are inexpensive. The valves are easily installed and removed from their assembly with the mixing vessel. The parts of the valves are easily assembled and taken apart.

While certain preferred embodiments of the invention have been disclosed, it will be appreciated that these are shown by way of example only, and the invention is not to be limited thereto as other variations will be apparent to those skilled in the art and the invention is to be given its fullest possible interpretation within the terms of the following claims.

What is claimed is:

1. Apparatus for deagglomerating and dispersing solid particles held in agglomerated form and carried in suspension in a liquid vehicle by the action of a dispersing media on the solids comprising:
   a mixing vessel in which provision is made for the particles to be subjected to the action of a dispersing media while being forced to flow through the interior of said vessel;
   a fluid inlet at the lower end of said vessel;
   a valve disposed in said inlet, said valve comprising,
      a valve body having an inlet adapted to be connected to means for introducing a fluid mixture into said inlet under pressure;
      means defining a bore in said valve body, one end of which defines an outlet from said valve body, and said valve body inlet communicating with said bore;
      a compression coil spring, with coils tightly positioned adjacent each other, disposed in said valve body outlet, said coil spring being openable in response to liquid pressure acting on plate means attached to and closing the outer end of said coil spring; and
      an actuating pin mounted in said valve body for longitudinal movement along its axis in said bore and
      adapted to be urged against said plate means for expanding said spring to permit liquid mixture to drain from said vessel through said coil spring.

2. The apparatus of claim 1 including
   a threaded connection supporting said actuating pin in said valve body to allow axial movement of said actuating pin.

3. The apparatus of claim 1 further comprising
   means for urging said actuating pin against said plate including cam means operatively connected with said valve body and said actuating pin.

4. The apparatus of claim 1 including
   a camming slot formed in the lower portion of said valve body and lever means connected to said actuating pin and extending through and riding in said camming slot whereby angular movement of said lever means in said camming slot moves said actuating pin longitudinally.

5. The apparatus of claim 1 wherein
   said actuating pin protrudes through said valve body and said apparatus further includes
   means associated with said valve body for moving said actuating pin along its longitudinal axis into and out of engagement with said plate means.

6. The apparatus of claim 1 including
   cam means associated with said valve body and said actuating pin whereby rotation of said actuating pin is effective to move said pin along its axis.

7. The apparatus of claim 1 wherein said valve body outlet is threaded and said compression coil spring is screwed into said threaded outlet.

8. In combination with apparatus for deagglomerating and dispersing solid particles in a mixing vessel said solid particles being held in agglomerated form and carried in suspension in a liquid vehicle by the action of a dispersing media on the solids a combination check and dump valve comprising:

a valve body having an inlet and an outlet, said inlet being adapted to be connected to means for introducing a fluid mixture into said inlet under pressure;

a compression coil spring with coils tightly positioned adjacent each other disposed in said valve body outlet;

plate means attached to and closing the outer end of said coil spring;

said coil spring being openable in response to liquid pressure acting on said plate means to allow flow into the mixing vessel, and mechanical means operatively associated with said valve for opening said coil spring from outside the mixing vessel to permit reverse flow through said coil spring out of the mixing vessel.

9. The apparatus of claim 8 wherein the valve body outlet is threaded and said compression coil spring is screwed into said threaded outlet.

10. The apparatus of claim 8 wherein said mechanical means includes an elongated actuating pin supported in said valve body and movable along its longitudinal axis into engagement with said plate means.

11. The apparatus of claim 8 including a camming slot formed in the lower portion of said valve body, an elongated actuating pin supported in said valve body and movable along its longitudinal axis into engagement with said plate means for opening the coils of said coil spring, and lever means connected to said actuating pin and extending through and riding in said camming slot whereby angular movement of said lever means in said camming slot moves said pin longitudinally.

12. The apparatus of claim 8 wherein said valve includes an elongated actuating pin threadedly supported in said valve body and movable along its longitudinal axis into and out of engagement with said plate means by rotating said pin.

13. The apparatus of claim 8 wherein the valve body outlet is threaded and said compression coil spring is screwed into said threaded outlet, said mechanical means includes an elongated actuating pin supported in said valve body and movable along its longitudinal axis into engagement with said plate means, and further including cam means associated with said valve body and said actuating pin whereby rotation of said actuating pin effects axial movement thereof.

* * * * *